(12) United States Patent
Borton et al.

(10) Patent No.: US 8,840,139 B1
(45) Date of Patent: Sep. 23, 2014

(54) AIRBAG WITH DEFLECTOR

(71) Applicant: Autoliv ASP, Inc., Ogden, UT (US)

(72) Inventors: Brian Joseph Borton, Grand Blanc, MI (US); Changsoo Choi, Rochester, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/828,092

(22) Filed: Mar. 14, 2013

(51) Int. Cl.
*B60R 21/16* (2006.01)
*B60R 21/2338* (2011.01)

(52) U.S. Cl.
CPC .................................. *B60R 21/2338* (2013.01)
USPC .......................... 280/740; 280/742; 280/743.2

(58) Field of Classification Search
CPC .............. B60R 21/233; B60R 21/2338; B60R 21/2346; B60R 2021/23382
USPC ........................ 280/729, 739, 740, 742, 743.2
See application file for complete search history.

(56) References Cited

U.S. PATENT DOCUMENTS

| | | | |
|---|---|---|---|
| 5,172,933 A | 12/1992 | Strasser | |
| 5,249,824 A | 10/1993 | Swann et al. | |
| 5,492,362 A | 2/1996 | Lehman et al. | |
| 5,513,879 A | 5/1996 | Patel et al. | |
| 5,529,337 A | 6/1996 | Takeda et al. | |
| 5,573,270 A | 11/1996 | Sogi et al. | |
| 5,669,632 A | 9/1997 | Johnson et al. | |
| 5,697,641 A | 12/1997 | McGee et al. | |
| 5,833,265 A | 11/1998 | Seymour | |
| 5,848,805 A * | 12/1998 | Sogi et al. | 280/743.2 |
| 5,884,574 A | 3/1999 | Sogi et al. | |
| 5,901,979 A | 5/1999 | Schneider et al. | |
| 5,918,902 A | 7/1999 | Acker et al. | |
| 5,957,485 A | 9/1999 | Hirai | |
| 6,022,046 A | 2/2000 | Isomura et al. | |
| 6,059,312 A | 5/2000 | Staub et al. | |
| 6,089,599 A | 7/2000 | Schimmoller et al. | |
| 6,089,600 A | 7/2000 | Schenck et al. | |
| 6,095,557 A | 8/2000 | Takimoto et al. | |
| 6,260,877 B1 | 7/2001 | Rasmussen, Sr. | |
| 6,276,716 B1 | 8/2001 | Kato | |
| 6,283,499 B1 | 9/2001 | Nelsen et al. | |
| 6,302,433 B1 | 10/2001 | Ellerbrok et al. | |
| 6,361,067 B1 | 3/2002 | Varcus et al. | |

(Continued)

FOREIGN PATENT DOCUMENTS

| | | |
|---|---|---|
| EP | 657329 | 6/1995 |
| EP | 1024060 | 8/2000 |

(Continued)

OTHER PUBLICATIONS

International Search Report and Written Opinion for PCT/US14/12366 filed Jan. 21, 2014, mailed May 28, 2014.

*Primary Examiner* — Paul N Dickson
*Assistant Examiner* — Robert A Coker
(74) *Attorney, Agent, or Firm* — Stoel Rives LLP

(57) ABSTRACT

An airbag can include a base panel and a cushioning panel that cooperate to define an inflatable chamber. A deflector can be positioned between the base panel and the cushioning panel. The deflector can be attached to the base panel so as to define a lower inflation aperture that directs inflation gas toward a bottom end of the base panel. In some arrangements, the airbag can include a tether that extends through the lower inflation aperture.

29 Claims, 11 Drawing Sheets

(56) References Cited

U.S. PATENT DOCUMENTS

| | | |
|---|---|---|
| 6,439,605 B2 | 8/2002 | Ariyoshi |
| 6,471,239 B1 | 10/2002 | Nishijima et al. |
| 6,471,244 B1 | 10/2002 | Nishijima et al. |
| 6,478,331 B1 | 11/2002 | Lang |
| 6,568,708 B2 | 5/2003 | Miodek et al. |
| 6,598,903 B2 | 7/2003 | Okada et al. |
| 6,612,609 B1 | 9/2003 | Rodriguez et al. |
| 6,648,366 B2 | 11/2003 | Dillon et al. |
| 6,676,158 B2 | 1/2004 | Ishikawa |
| 6,848,714 B2 | 2/2005 | Varcus |
| 7,066,487 B2 | 6/2006 | Sullivan et al. |
| 7,210,701 B2 | 5/2007 | Meissner et al. |
| 7,210,702 B2 | 5/2007 | Soderquist |
| 7,264,268 B2 | 9/2007 | Ehrke |
| 7,316,415 B2 | 1/2008 | Jamison |
| 7,398,992 B2 | 7/2008 | Marriott |
| 7,543,849 B2 | 6/2009 | Bradburn |
| 7,648,166 B2 | 1/2010 | Maripudi |
| 7,708,305 B2 | 5/2010 | Ishiguro et al. |
| 7,837,228 B2 * | 11/2010 | Abe .................. 280/743.1 |
| 7,922,191 B2 | 4/2011 | Choi |
| 8,061,734 B2 | 11/2011 | Parks et al. |
| 8,215,665 B2 | 7/2012 | Ohara et al. |
| 8,282,122 B2 | 10/2012 | Marable et al. |
| 8,419,050 B2 | 4/2013 | Yoo |
| 8,419,056 B2 | 4/2013 | Parks et al. |
| 8,480,122 B2 | 7/2013 | Ohara |
| 2001/0028162 A1 | 10/2001 | Takimoto et al. |
| 2003/0151233 A1 | 8/2003 | Varcus |
| 2003/0168842 A1 * | 9/2003 | Igawa .................. 280/743.1 |
| 2003/0201628 A1 | 10/2003 | Roychoudhury et al. |
| 2005/0073139 A1 | 4/2005 | Fischer et al. |
| 2005/0285379 A1 * | 12/2005 | Soderquist .................. 280/740 |
| 2006/0197320 A1 | 9/2006 | Abe |
| 2006/0249939 A1 | 11/2006 | Maripudi |
| 2007/0278774 A1 | 12/2007 | Ishiguro et al. |
| 2008/0224457 A1 | 9/2008 | Brough et al. |
| 2009/0256338 A1 | 10/2009 | Williams |
| 2011/0079991 A1 | 4/2011 | Ravenberg et al. |
| 2011/0148083 A1 | 6/2011 | Paxton et al. |
| 2013/0221645 A1 * | 8/2013 | Yamada .................. 280/742 |
| 2013/0229004 A1 * | 9/2013 | Suzuki et al. .................. 280/742 |

FOREIGN PATENT DOCUMENTS

| | | |
|---|---|---|
| EP | 1183170 | 3/2002 |
| EP | 1369317 | 1/2006 |
| EP | 1778525 | 5/2007 |
| GB | 2252083 | 1/1991 |
| GB | 2261855 | 6/1993 |
| GB | 2277719 | 11/1994 |
| GB | 2331049 | 5/1999 |
| JP | 1132444 | 5/1989 |
| JP | 04244453 | 9/1992 |
| JP | 7156730 | 6/1995 |
| JP | 8011659 | 1/1996 |
| JP | 2001277988 | 10/2001 |
| JP | 2001322521 | 11/2001 |
| JP | 2003525810 | 9/2003 |
| JP | 4513724 | 7/2010 |
| JP | 5069848 | 8/2012 |
| WO | WO-98/42543 | 3/1998 |
| WO | WO-00/15474 | 6/1999 |
| WO | WO-99/42332 | 8/1999 |
| WO | WO-2011/079044 | 6/2011 |

* cited by examiner

AIRBAG WITH DEFLECTOR

BACKGROUND

Airbags can be mounted in a steering wheel or other vehicular structure and deployed so as to prevent a vehicle occupant from impacting the vehicular structure in a collision event. In some instances, the airbags can suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1A:
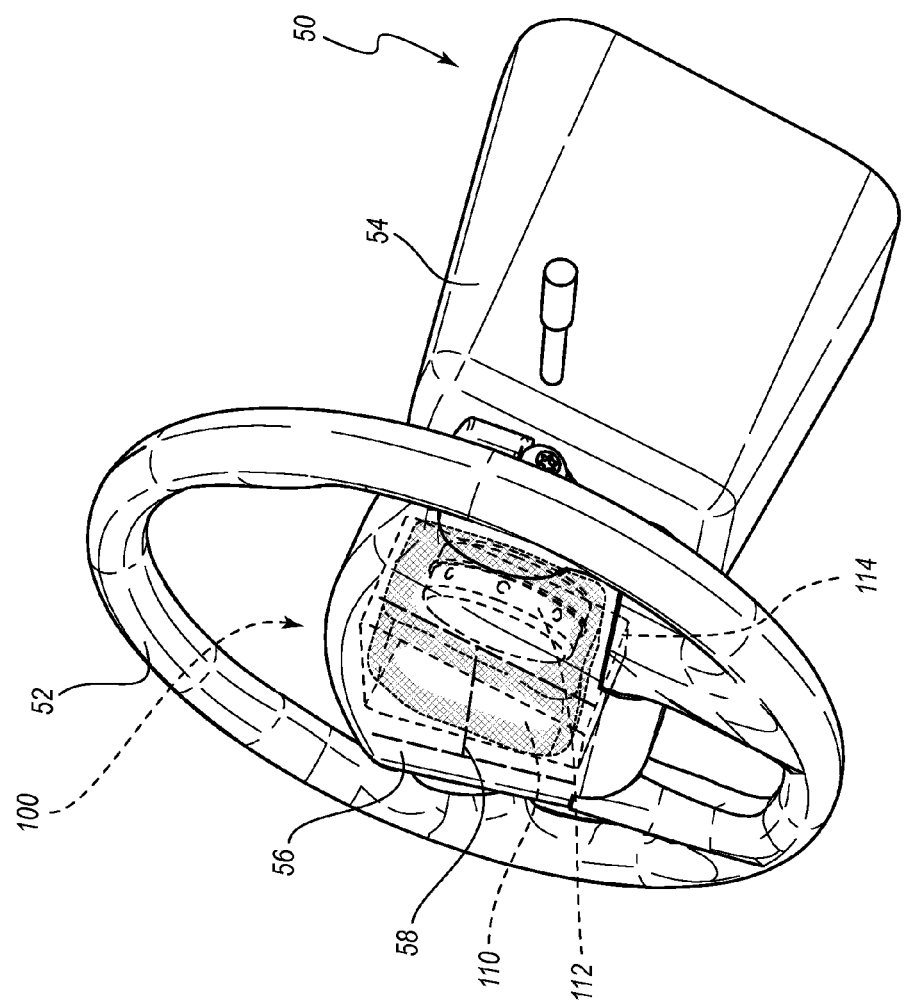
FIG. 1A is a perspective view of an embodiment of an airbag assembly mounted in a vehicle, wherein an embodiment of an airbag is shown in a packaged or undeployed state.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The phrases "connected to" and "coupled to" are used in their ordinary sense, and are broad enough to refer to any suitable coupling or other form of interaction between two or more entities, including mechanical, fluid and thermal interaction. Two components may be coupled to each other even though they are not in direct contact with each other. The phrases "attached to" or "attached directly to" refer to interaction between two or more entities which are in direct contact with each other and/or are separated from each other and/or coupled to each other by a fastener of any suitable variety (e.g., mounting hardware, adhesive, stitching), regardless of whether the fastener extends through additional components. The phrase "fluid communication" is used in its ordinary sense, and is broad enough to refer to arrangements in which a fluid (e.g., a gas and/or a liquid) can flow from one element to another element when the elements are in fluid communication with each other.

Inflatable airbag systems are widely used to reduce or minimize occupant injury in a collision scenario. Airbag modules have been installed at various locations within a vehicle, including, but not limited to, the steering wheel, the instrument panel, within the side doors or side seats, adjacent to roof rail of the vehicle, in an overhead position, or at the knee or leg position. In the following disclosure, "airbag" generally refers to an inflatable front airbag, such as a driver airbag, although the principles discussed may apply to other airbag types in other embodiments.

Front airbags are typically installed in the steering wheel and instrument panel of a vehicle. During installation, the airbags are rolled and/or folded, and may be retained in the packaged state behind a cover. During a collision event, an inflator is triggered, which rapidly fills the airbag with inflation gas. Thus, the airbag rapidly changes from a rolled and/or folded configuration (also referred to as a packaged configuration) to an expanded or deployed configuration. For example, the expanding airbag can open the cover (e.g., tear through a burst seam or open a door-like structure) so as to exit a housing. The inflator may be triggered by any suitable device or system, and the triggering may be in response to and/or influenced by one or more vehicle sensors.

Certain embodiments of airbag assemblies that are disclosed herein are particularly well suited for use as driver airbags, and may be mounted in a steering wheel. The airbag assemblies can include airbags that are configured to deploy in an advantageous way. In particular, in some embodiments, the airbags are configured to initially deploy in a downward direction and can cover a lower end of the steering wheel. In some embodiments, the airbags can include a tether that provides the airbag with a desired shape and/or can maintain a desired shape and/or orientation during ride down of the vehicle occupant. In certain arrangements, the tether can provide the airbag with stability and can maintain the stability during ride down of the vehicle occupant. In certain embodiments, the airbag can reduce the risk of entrapping the chin of the vehicle occupant during deployment, such as by deploying downwardly more quickly and/or by deploying in a less vehicle rearward direction as other airbags. One or more of the foregoing advantages and/or other advantages of various embodiments described below will be evident from the present disclosure.

Figure 1B:
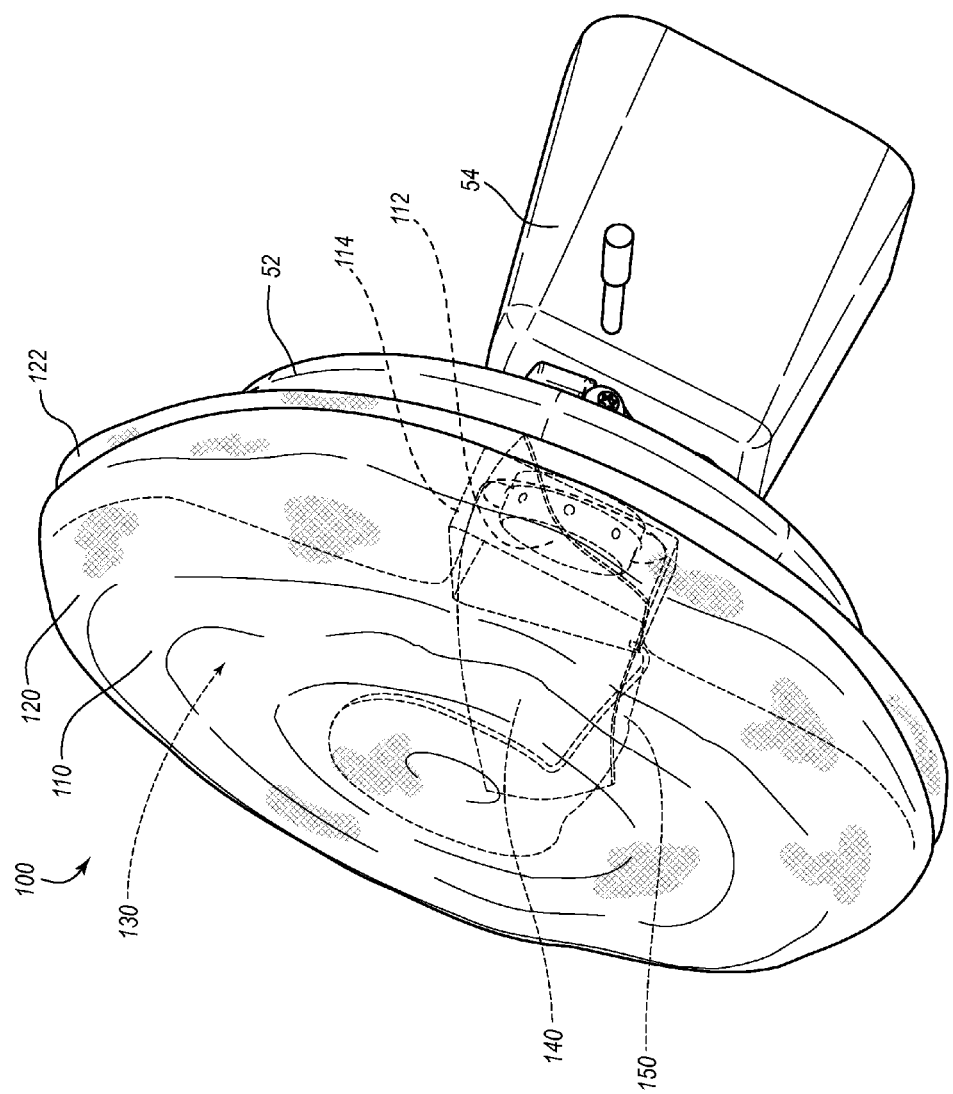
FIG. 1B is another perspective view of the airbag assembly of FIG. 1A showing the airbag in a deployed state.

FIGS. 1A-1B depict airbag assembly 100 in two different configurations. FIG. 1A depicts airbag assembly 100 in a packaged configuration, and FIG. 1B depicts the airbag assembly 100 in a deployed and inflated configuration. FIGS. 1A-1B further depict a steering wheel 52 and a steering column 54 of a vehicle 50. The steering wheel 52 includes a cover 56, behind which airbag assembly 100 is located. The cover 56 may be of any suitable variety, and may include a tear seam or burst seam 58 through which an airbag can deploy.

The airbag assembly 100 can include an inflatable airbag 110, an inflator 112, and an airbag housing 114. In the illustrated embodiment, the airbag 110 includes a cushioning panel 120, which in the deployed and inflated configuration is generally directed toward an occupant or an occupant position (e.g., a vehicle seat), and may at least partially define a cabin side of the airbag 110. A base panel 122 is located opposite the cushioning panel 120. In the illustrated embodiment, the base panel 122 is adjacent to the steering wheel 52 when the airbag 110 is in the deployed and inflated configuration. The cushioning panel 120 and the base panel 122 may also be referred to as a rear panel 120 and a front panel 122, in view of the relative positions of these panels within the vehicle when the airbag 110 is deployed. The base panel 122 and the cushioning panel 120 cooperate to define an inflatable chamber 130. The panels 120, 122 may also be referred to as airbag cushion membranes, and may be formed of any suitable material. For example, in some embodiments, the panels 120, 122 are formed of a woven nylon fabric. Moreover, a variety of types and configurations of airbag cushion membranes can be utilized in various embodiments. For example, the size, shape, and proportions of the cushion membrane may vary according to its use in different vehicles or different locations within a vehicle.

The airbag 110 can further include a deflector 140 that is configured to direct inflation gases in a desired manner or pattern during deployment of the airbag, as discussed further below. The deflector 140 may comprise a panel, which can be formed of any suitable material, such as, for example, any of the materials discussed above with respect to the panels 120, 122. For example, in some embodiments, the deflector 140 and the panels 120, 122 may be formed of the same material. In other embodiments, the deflector 140 may be formed of a material that is stiffer, thicker, stronger, and/or more heat-resistant than the material of which the panels 120, 122 are formed, and yet may still able to be folded and/or rolled into a packaged configuration. In some embodiments, the deflector 140 may include a woven nylon material, which in further embodiments, may be coated with one or more materials, such as silicone.

In some embodiments, the airbag 110 can further include a tether 150, which can be attached to the cushioning panel 120. The tether 150 may be referred to as a depth delimiting tether and/or as a stabilizing tether. The tether 150 can assist with achieving a desired profile of the airbag 110 during deployment, once the airbag 110 is fully inflated, and/or during ride down of a vehicle occupant after the vehicle occupant impacts the inflated airbag 110, as discussed further below. The tether 150 may be formed of any suitable material, such as, for example, any of the materials discussed above with respect to the panels 120, 122. For example, in some embodiments, the tether 150 and the panels 120, 122 may be formed of the same material. In other embodiments, the tether 150 may be formed of a material that is stiffer, thicker, and/or stronger than the material of which the panels 120, 122 are formed.

Figure 2:
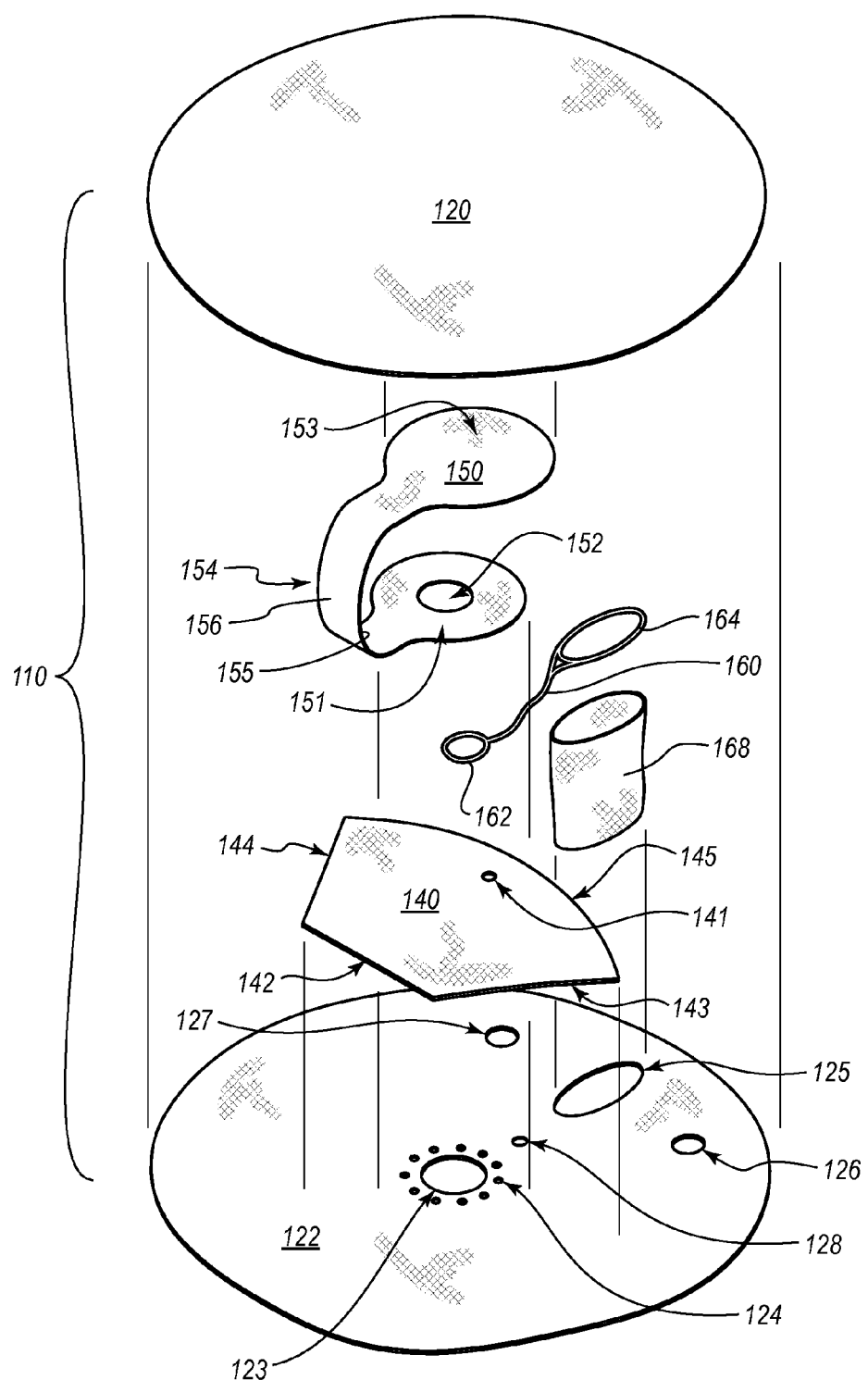
FIG. 2 is an exploded perspective view of the airbag of FIGS. 1A and 1B.
Figure 3:
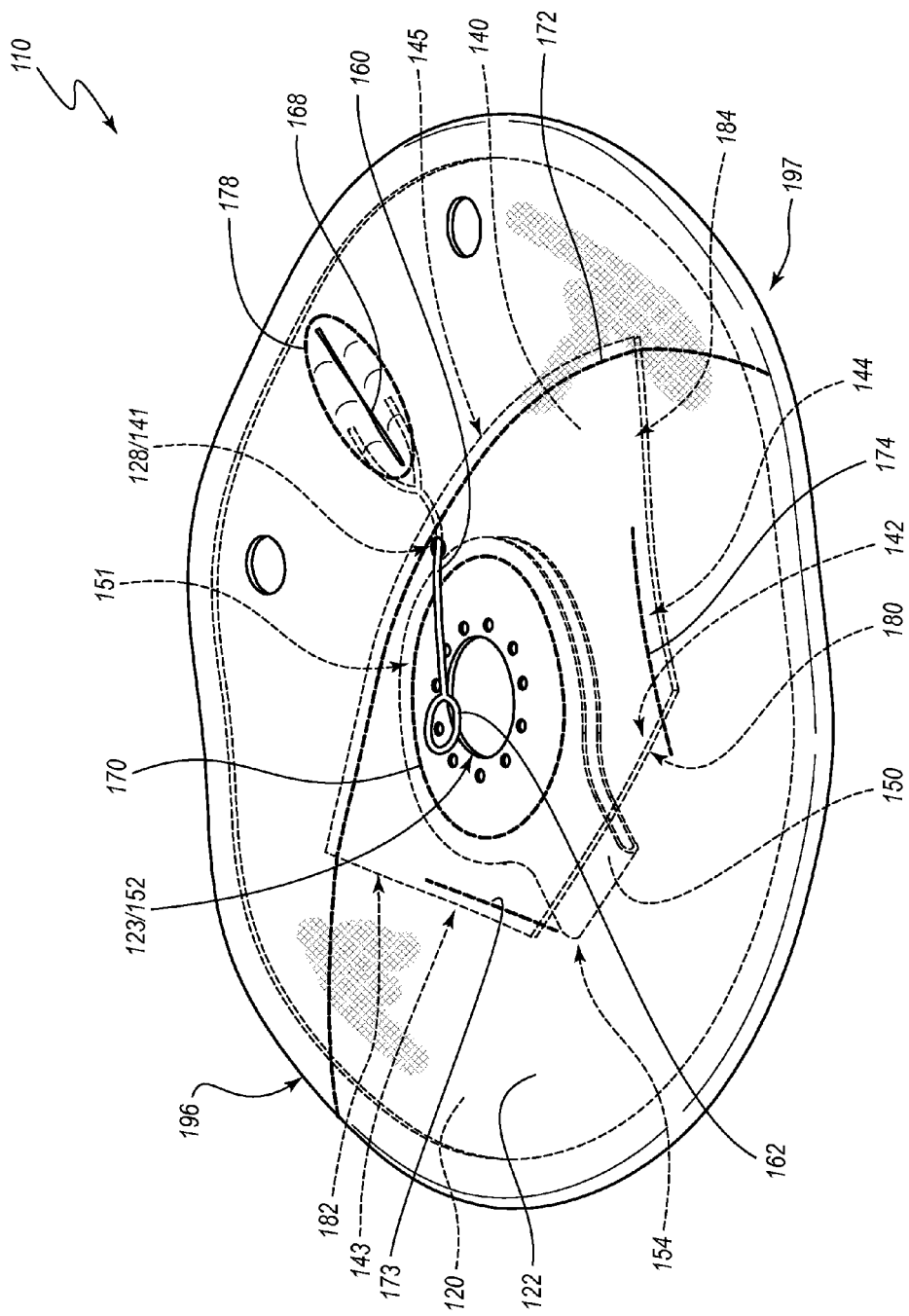
FIG. 3 is a perspective view of the airbag of FIGS. 1A and 1B shown in an assembled state, wherein an embodiment of a base panel is shown.
Figure 4:
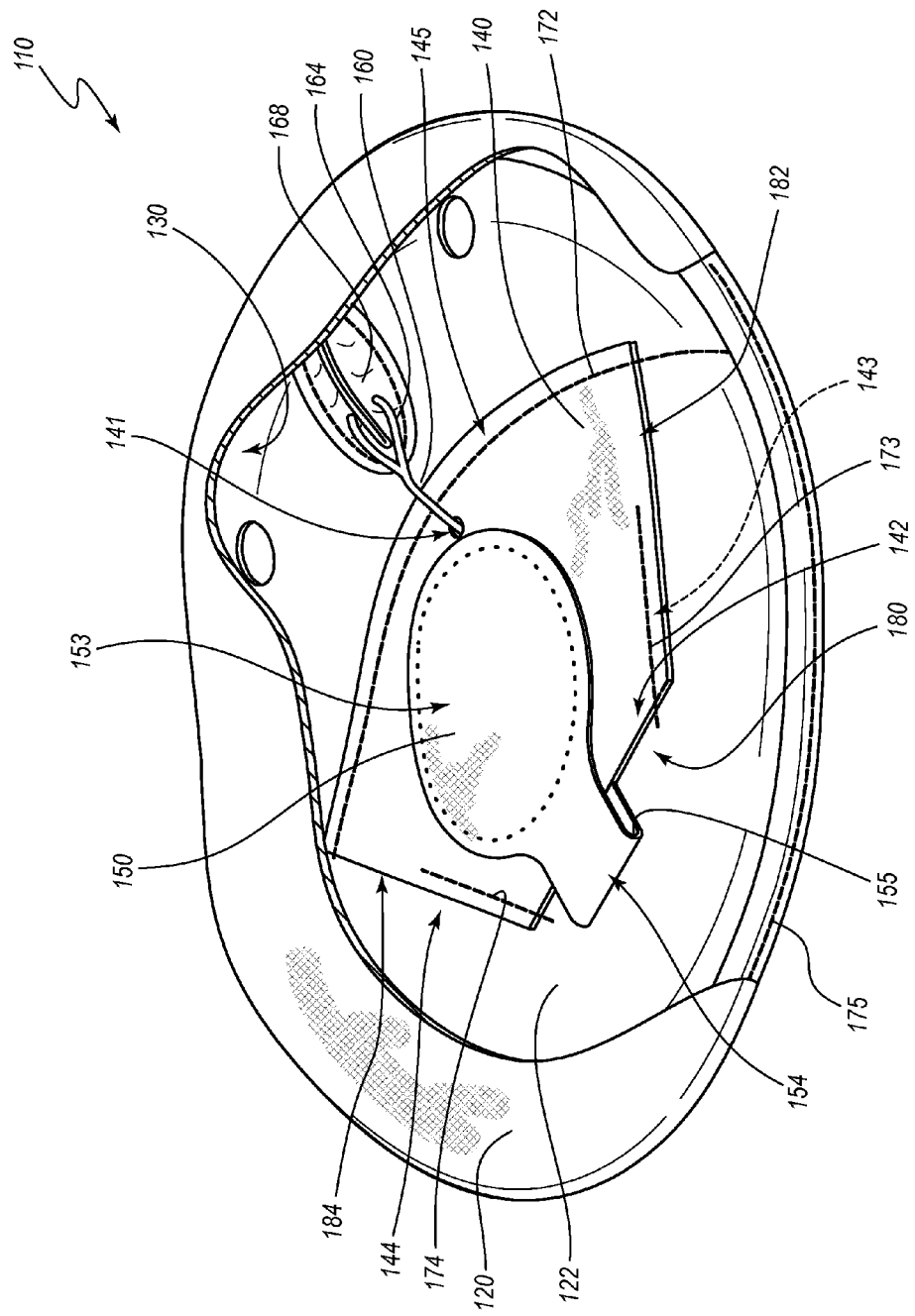
FIG. 4 is a perspective partial cutaway view of the airbag of FIGS. 1A and 1B, in a direction opposite of that depicted in FIG. 3, wherein a portion of an embodiment of a cushioning panel is shown and a portion of an embodiment of a tether is also shown, wherein a seam that attaches the tether to the cushioning panel is omitted from the illustrated view.
Figure 5:
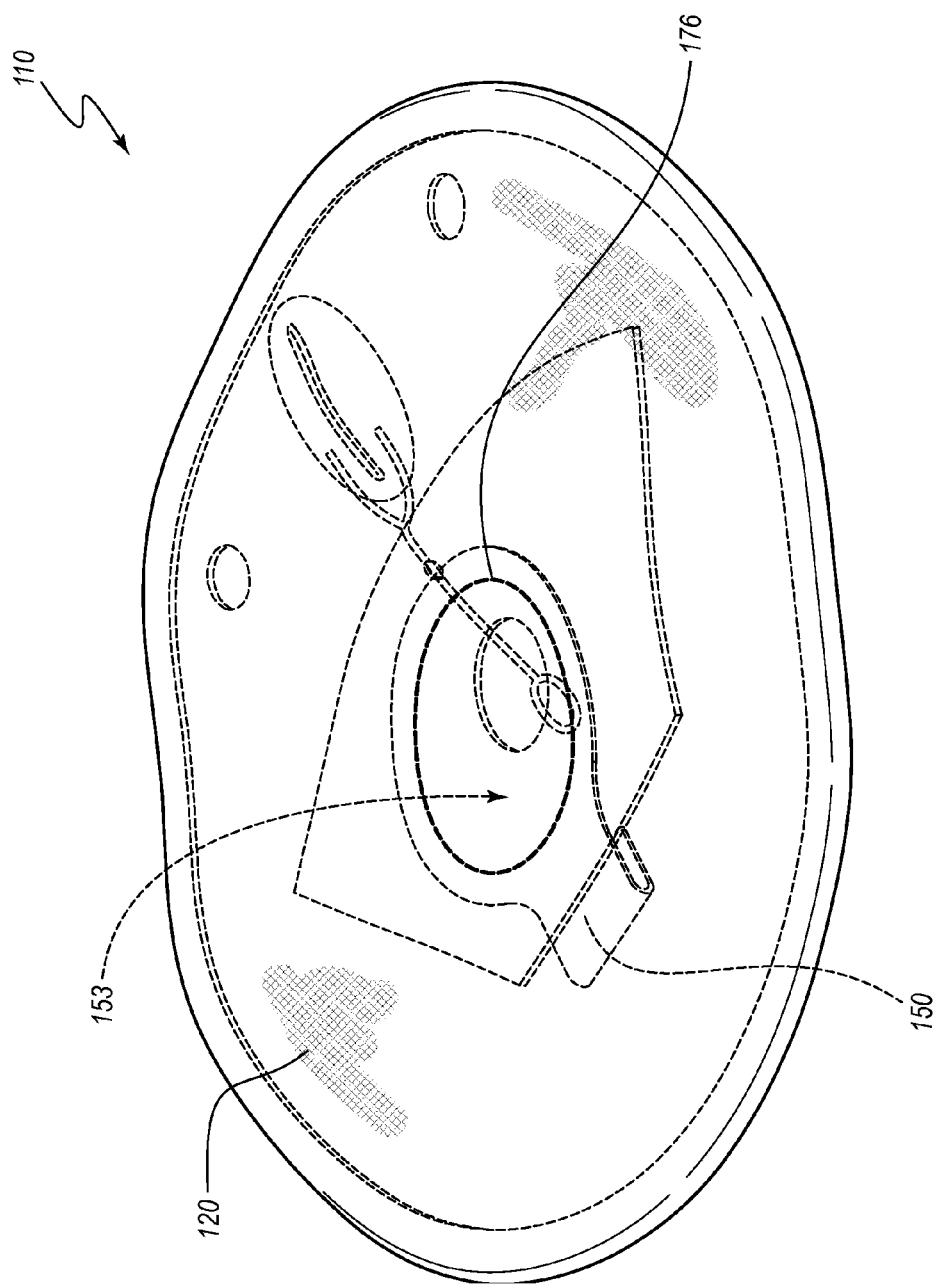
FIG. 5 is a perspective view of the airbag of FIGS. 1A and 1B similar to the view shown in FIG. 4, wherein the tether is shown attached to the cushioning panel.

FIG. 2 depicts an exploded view of the airbag 110, or stated otherwise, the airbag 110 is shown in an unassembled state. FIGS. 3-5 depict various perspective views of the airbag 110 in an assembled state. In particular, FIG. 3 is a perspective view of the assembled airbag 110 that is directed toward the base panel 122, FIG. 4 is a perspective partial cutaway view of the assembled airbag 110 that is directed toward the cushioning panel 120, and FIG. 5 is a perspective view of the assembled airbag 110 that is directed toward the cushioning panel 120. For clarity, a seam 176 that joins a portion of the tether 150 to the cushioning panel is not depicted in the partial cutaway view of FIG. 4, but is shown instead in the perspective view of FIG. 5.

With reference to FIGS. 2-5, in the illustrated embodiment, the cushioning panel 120 and the base panel 122 are each substantially circular and are the same size, such that their peripheries substantially overlap or align with each other if the cushioning panel 120 is placed on top of the base panel 122. As previously mentioned, the base panel 122 and the cushioning panel 120 can cooperate to define the inflatable chamber 130 (see FIG. 4). The cushioning panel 120 and the base panel 122 can be joined together in any suitable manner, such as via a seam 175. The seam 175 may be of any suitable variety, whether sealed or unsealed, and may be formed via stitching, one or more adhesives, taping, welding (e.g., radio frequency welding), heat sealing, or any other suitable technique or combination of techniques, and thus the seam 175 may comprise one or more of stitches, welds (e.g., radiofrequency welds), and/or adhesives. In some embodiments, the seam 175 may comprise a single row of stitches. In other embodiments, the seam 175 may include multiple rows of stitches, which may aid in reinforcing the seam 175. Such options for forming seams apply equally to other seams discussed herein. In the illustrated embodiment, the seam 175 comprises a single row of stitches, although multiple rows of stitches (e.g., two parallel rows) are possible. During assembly of the airbag 110, in some embodiments, the exterior surfaces of the panels 120, 122 are positioned so as to face one another and the seam 175 is formed about the periphery of the panels 120, 122. The panels 120, 122 can subsequently be inverted such that the seam 175 is at an interior of the airbag 110, as illustrated in FIG. 4.

The cushioning panel 120 may be configured to expand so as to define a cushion for receiving a head and/or torso of a passenger. In the illustrated embodiment, the cushioning panel 120 is substantially dome-shaped when in the inflated configuration, and may be circularly or rotationally symmetric. Any other suitable shape or configuration of the rear panel 120 is contemplated.

Figure 7:
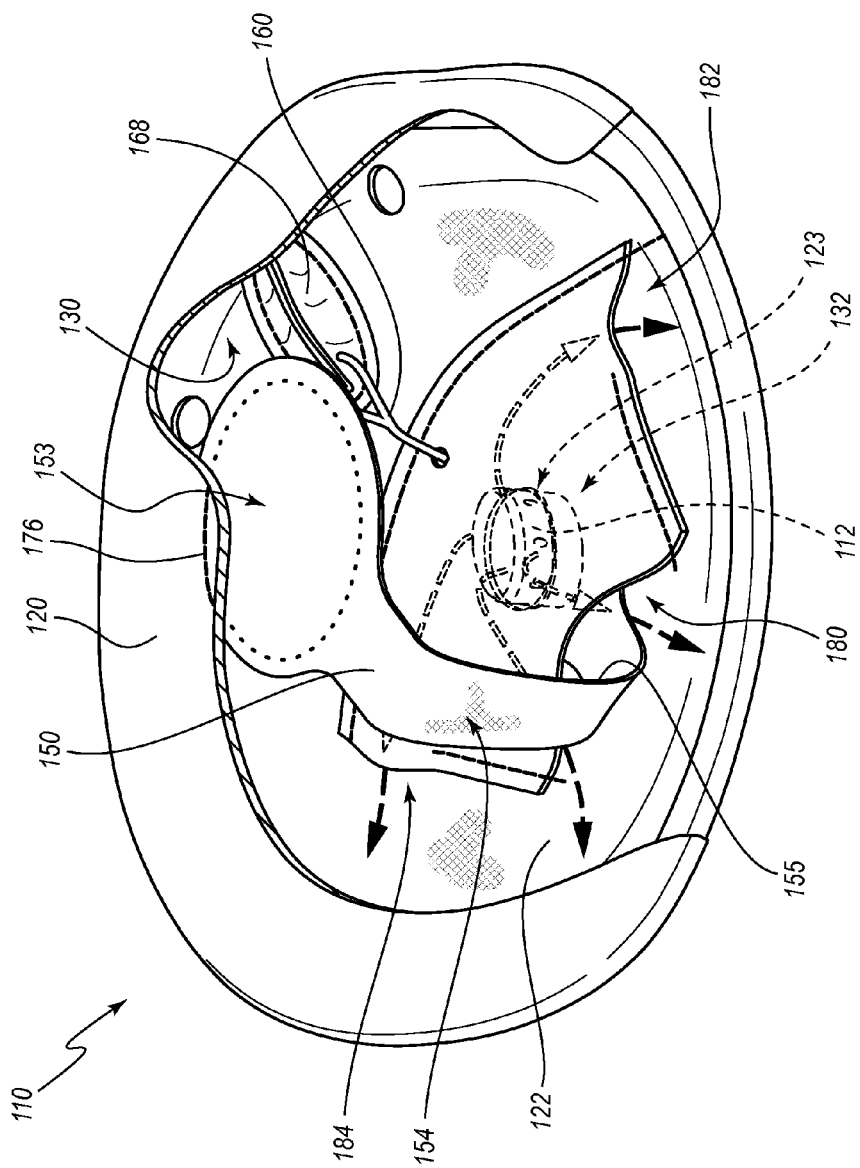
FIG. 7 is a perspective partial cutaway view of the airbag of FIGS. 1A and 1B in the process of being inflated.

The base panel 122 can define an inflator opening 123 that is configured to be coupled with the inflator 112. For example, in some embodiments, the inflator opening 123 is sized to receive at least a portion of the inflator 112 therein, as shown in FIG. 7. In other embodiments, the inflator opening 123 may merely be fluidly coupled with the inflator 112, without being physically coupled to the inflator 112. For example, in other embodiments, the inflator may not extend through the inflator opening 123, but may be positioned so as to introduce inflation gas into the airbag 110 through the inflator opening 123.

With continued reference to FIGS. 2-5, the base panel 122 can define one or more mounting apertures 124 through which mounting hardware (not shown) can extend. Any suitable mounting hardware is possible, such as bolts, screws, etc. The mounting apertures 124 can be used to secure the base panel 122 directly to the airbag housing 114, which may in turn be secured to any suitable portion of the vehicle 50, such as via a mounting bracket. In other embodiments, the mounting hardware that is inserted through the mounting apertures 124 may directly attach both the base panel 122 and the airbag housing 114 to the vehicle 50.

The base panel 122 may further define one or more venting apertures 125, 126, 127. In the illustrated embodiment, the venting aperture 125 is coupled with a venting tube or venting trunk 168 so as to permit selective or active venting through the venting aperture 125, as discussed further below. The venting trunk 168 may be joined to the base panel 122 in any suitable manner, such as via a seam 178. In some embodiments, the base panel 122 defines a venting aperture 128 through which a venting tether 160 can pass. The venting tether 160 is described in further detail below. The one or more venting apertures 126, 127 may permit passive venting, such as when a vehicle occupant is cushioned by the airbag 110 during ride down.

The deflector 140 can be shaped and/or attached to the base panel 122 in a manner suitable for achieving a desired fill pattern for the airbag 110. In the illustrated embodiment, the deflector 140 has four discrete ends: a lower end 142, an inboard end 143, and outboard end 144, and an upper end 145. As used herein, the terms "upper," "lower," "inboard," and "outboard" refer to relative positions within the vehicle 50 when the airbag 110 is deployed and when the airbag 110 is installed as a driver-side airbag. In other arrangements, such as where the airbag 110 is used in vehicles having oppositely oriented driver and passenger sides and/or as a passenger-side airbag, the inboard and outboard ends 143, 144 may be reversed. Each of the lower end 142 and the inboard and outboard ends 143, 144 includes an edge that is substantially flat or linear. The upper end 145 includes an edge that is substantially semicircular, or is arc-shaped, rounded, or curved. The linear edges of the inboard and outboard ends 143, 144 can extend downwardly from lateral ends of the semicircular edge defined by the upper end 145 and can taper inwardly into contact with lateral ends of the linear edge defined by the lower end 142. In the illustrated embodiment, the deflector 140 resembles a portion of a baseball diamond. The deflector 140 may also be said to have a rounded upper end 145 that is joined to a substantially trapezoidal region that narrows in a downward direction. Other suitable shapes, configurations, and arrangements of the deflector 140 are also possible, as discussed further below.

The deflector 140 can be attached to the base panel 122 via one or more seams. In the illustrated embodiment, a continuous upper seam 172 attaches the upper end 145 to the base panel 122 and a pair of lower seams 173, 174 attach the inboard and outboard ends 143, 144 to the base panel 122, respectively. Each seam 172, 173, 174 can be inset slightly from the outermost edges defined by each of the upper, inboard, and outboard ends 145, 143, 144, respectively. Whereas the upper seam 172 is continuous and extends along an entirety of the upper end 145, the lower seams 173, 174 extend along only the lower portion of the inboard and outboard ends 143, 144. A portion of the inboard end 143 of the deflector 140 that is between the upper seam 172 and an upper end of the inboard lower seam 173 is unattached to the base panel 122 and cooperates with the base panel 122 to define an inboard lateral inflation aperture 182. Similarly a portion of the outboard end 144 of the deflector 140 that is between the upper seam 172 and an upper end of the outboard lower seam 174 is unattached to the base panel 122 and cooperates with the base panel 122 to define an outboard lateral inflation aperture 184. The portion of the lower end 142 of the deflector 140 that is between the lower seams 173, 174 is unattached to the base panel 122 and cooperates with the base panel 122 to define a lower inflation aperture 180.

In general, the deflector 140 can cover, or be positioned over, the inflator opening 123. The deflector 140 can cooperate with the base panel 122 to define an inflation cavity 132 (see FIG. 7) into which inflation gases are initially introduced by the inflator 112. The inboard lateral inflation aperture 182, the outboard lateral inflation aperture 184, and the lower inflation aperture 180 can each provide fluid communication between the inflation cavity 132 and the inflatable chamber 130, such that inflation gases can exit from the inflation cavity 132 into the inflatable chamber 130 in predetermined directions. Stated otherwise, the inflation apertures 180, 182, 184 inflation apertures can direct inflation gases to specific regions of the airbag 110 during deployment of the airbag. In some embodiments, the various seams 172, 173, 174 that connect the deflector 140 to the base panel 122 can be substantially airtight so as to prevent inflation gas from exiting the inflation cavity 132 thereat. In some embodiments, the one or more seams 172, 173, 174 can extend beyond the outer edges of the deflector 140, such as for purposes of reinforcement. In the illustrated embodiment, the upper seam 172 extends from an inboard lateral end 196 to an outboard lateral end 197 of the base panel 122. In other embodiments, the upper seam 172 may be shorter, and may extend only slightly past the lateral edges of the deflector 140, such as by the same amount by which the lower seams 173, 174 extend past the lower edge of the deflector 140.

In other embodiments, two or more separate seams may be used for any of the seams 172, 173, 174. For example, in some embodiments, the upper seam 172 may comprise a series of seams that are connected to prevent inflation gases from exiting the inflation cavity 132 at the upper end of the deflector 140. Moreover, in other embodiments, the deflector 140 may have a different shape than that shown in the illustrated embodiment. For example, although a differently shaped deflector 140 may be used, similarly functioning inflation apertures 180, 182, 184 may be achieved via similarly oriented seams 172, 173, 174. For example, in some embodiments, the deflector 140 may extend outwardly beyond the seams 172, 173, 174 by a greater extent than the illustrated embodiment, and may have a perimeter that is not closely matched to the configuration of the seams 172, 173, 174 (e.g., the upper edge may be other than semicircular and/or the lateral and lower edges may be other than linear), yet the deflector 140 may define inflation apertures 180, 182, 184 between the seams 172, 173, 174 that function the same or similarly to those of the illustrated embodiment. However, in some instances, providing the deflector 140 having a shape that closely resembles, and extends outwardly relative to the seams 172, 173, 174 by a small amount, such as in the illustrated embodiment, can keep material costs low.

In the illustrated embodiment, the deflector 140 is substantially planar when in attached to the base panel 122 and laid flat in the orientation shown, for example, in FIGS. 3 and 4. In other embodiments, the material of which the deflector 140 is formed may be larger, or wider, than the spacing between adjacent attachment seams 172, 173, 174. In other words, the material of deflector 140 may not be pulled taut by the seams 143, such that the deflector 140 can be in a non-planar shape when the airbag 110 is laid flat. Stated otherwise, due to a greater length or amount of deflector material that is present at each of the inflation apertures 180, 182, 184, as compared with a distance between adjacent seams 172, 173, 174, when the deflector 140 is viewed end-on at any of the apertures 180, 182, 184, there can be slack in the material of deflector 140, such that even when inflation gas is not passing through the deflector 140, the deflector 140 defines a non-planer shape. Other arrangements of the deflector 140 are also possible.

With continued reference to FIGS. 2-5, in some embodiments, the airbag 110 includes the venting trunk 168, which can be used for active venting of the inflatable chamber 130. The venting tether 160 can be attached to the venting trunk 168 at a distal end 164 thereof. A proximal end 162 of the venting tether 160 may be selectively attached to an active release mechanism of any suitable variety (not shown). As used herein, the terms proximal and distal refer to proximity to the inflator 112 and/or direction of inflation gas flow during deployment, where more proximally oriented features are closer to the inflator and/or contact inflation gases sooner than do more distally oriented features. When conditions within the vehicle 50 are such that rapid venting from the inflatable chamber 130 are desired, the release mechanism may be triggered to release the venting tether 160 and allow the venting trunk 168 to open and permit inflation gases to rapidly escape the inflatable chamber 130.

In certain embodiments, the deflector 140 defines a tether aperture 141 through which the venting tether 160 extends. For example, in some embodiments, the release mechanism can be at or near the inflator 112 such that it can be desirable for the venting tether 160 to extend through the deflector 140 so as to couple the venting trunk 168 to the release mechanism. In the illustrated embodiment, the release mechanism is near the inflator 112 at an exterior of the airbag 110, and the venting tether 160 can extend through both the deflector 140 and the base panel 122 via the tether apertures 128, 141. In some embodiments, the tether apertures 128, 141 can closely or snugly fit the venting tether 160 so as to prevent or inhibit inflation gas from exiting the inflation cavity 132 through the venting apertures 128, 141.

With continued reference to FIGS. 2-5, in the illustrated embodiment, the airbag 110 includes the tether 150, which can provide the airbag with a desired inflated shape and/or filling pattern, as discussed below. The tether 150 may serve to stabilize the airbag 110, such as during initial cushioning of a vehicle occupant and/or subsequent ride down, which is also discussed below. The tether 150 can include a proximal end 151, a distal end 153, and an intermediate region 154 that extends between the proximal and distal ends 151,153. The proximal end 151 can be attached to the base panel 122 in any suitable manner, such as via the seam 170. In the illustrated embodiment, the proximal end 151 of the tether 150 defines an inflator opening 152 that is configured to be coupled with the inflator 112 in any suitable manner, such as one or more of physically and fluidly. In the illustrated embodiment, the inflator opening 152 is aligned with the inflator opening 123 of the base panel 122. The proximal end 151 of the tether 150 thus can encompass the inflator 112 when the airbag assembly 100 is in an assembled state.

A proximal portion of the intermediate region 154 of the tether 150 can extend downwardly through the inflation aperture 180, as shown in FIGS. 3-5. A more distal portion of the intermediate region 154 can be rotated, bent, folded, curved, or otherwise redirected in an upward direction. The distal end 153 of the tether 150 can be attached to the cushioning panel 120 via the seam 176, as shown in FIG. 5. In the illustrated embodiment, the proximal end 151 of the tether 150 is attached to a central region of the base panel 122 and the distal end 153 of the tether 150 is attached to a central region of the cushioning panel 123. A first surface 156 of the tether 150 can face each of the cushioning and base panels 120, 122, whereas a second surface 155 can face the lower inflation aperture 180. At least a portion of the second surface 155 may comprise a reaction surface that can interact with or be influence by inflation gas that exits the lower inflation aperture 180. In the illustrated embodiment, the intermediate region 154 of the tether 150 is relatively wide, and thus the reaction surface 155, which is at an upper surface of the tether 150, can be readily influenced by the inflation gas.

Figure 6:
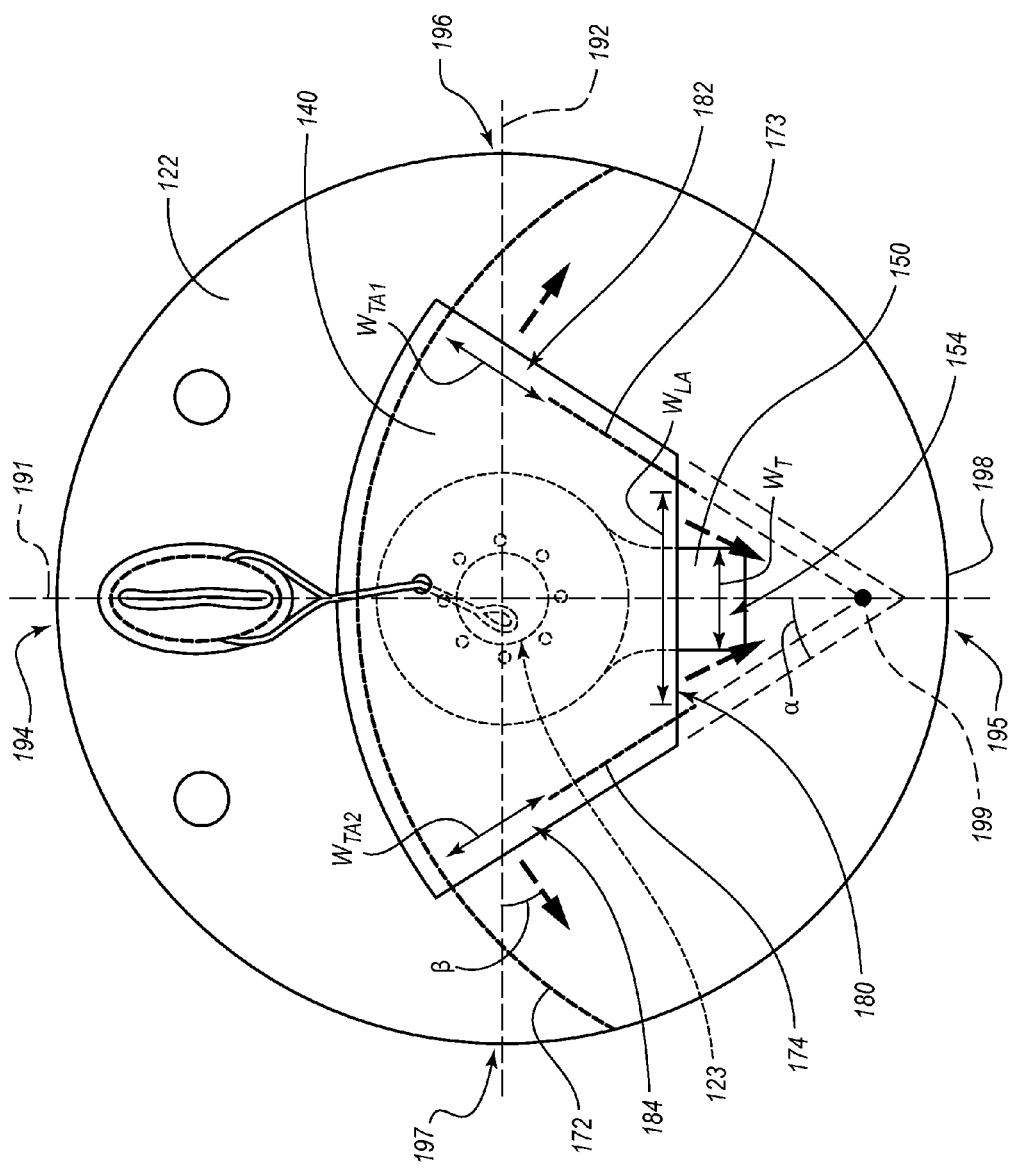
FIG. 6 is a plan view of various components of the airbag of FIGS. 1A and 1B, wherein the cushioning panel is not shown.

With reference to FIG. 6, a width $W_T$ of the tether 150 may be a significant fraction of a maximum lateral width $W_{LA}$ of the lower aperture 180, which is delimited by the lower seams 173, 174. In some embodiments, the greater the size of the width $W_T$ of the tether 150 in proportion to the maximum lateral width $W_{LA}$ of the lower aperture 180, the greater the influence inflation gas exiting the lower inflation aperture 180 can have on the tether 150, particularly during early stages of deployment. In various embodiments, the width $W_T$ of the tether 150 is no less than about ⅙, ⅕, ¼, ⅓, ½, or ⅔ the value of the maximum lateral width $W_{LA}$ of the lower aperture 180.

The base panel 122 is depicted in FIG. 6, and a longitudinal axis 191, a lateral axis 192, a top end 194, a bottom end 195, an inboard lateral end 196, and an outboard lateral end 197 thereof are identified. The foregoing directional terms are made with respect to the orientation shown in FIG. 6. However, these directional terms are also consistent with other directional terms used herein, which reference relative positions when the airbag 110 is installed in a vehicle and inflated. The longitudinal and lateral axes 191, 192 are orthogonal to one another, with the longitudinal axis 191 shown as vertical and the lateral axis 192 shown as horizontal in FIG. 6. In the illustrated embodiment, the base panel 122 is substantially circular, such that the longitudinal and lateral axes 191, 192 divide the base panel 122 into four equal quadrants. Moreover, the lateral axis 192 divides the base panel 122 into an upper half, or upper portion, and a lower half, or lower portion. Both axes 191, 192 are centered on the inflator opening 123 in the illustrated embodiment. In other embodiments, the base panel 122 may define other shapes, and may not be symmetrical about one or more of the axes 191, 192. In such embodiments, the axes 191, 192 may nevertheless be centered on the inflator opening 123, with the lateral axis 192 dividing the base panel 122 into an upper portion and a lower portion.

As can be appreciated from the downwardly directed arrows, the lower inflation aperture 180 can be configured to direct inflation gas toward the bottom end 195 of the base panel 122 during deployment of the airbag 110. In the illustrated embodiment, the lower seams 173, 174 taper inwardly toward the longitudinal axis 191 in the downward direction, and thus are configured to concentrate inflation gas toward the lower inflation aperture 180. This is represented by the downwardly directed arrows each having a laterally inward component. Stated otherwise, the arrows representing gas flow out of the lower inflation aperture 180 are directed downwardly toward the bottom end 195 of the base panel 122 and inwardly toward the longitudinal axis. In some embodiments, the lower seams 173, 174 are configured to concentrate the inflation gas toward a focal point 199, which may be at the lower end 195 of the base panel 122. In the illustrated embodiment, the focal point 199 is somewhat inward of a peripheral edge 198 of the base panel 122. In other embodiments, the focal point 199 may be at an exterior of the peripheral edge 198, such that the inflation gas is concentrated toward the focal point 199, but is redirected by the lower end of the airbag 110 so as not to in fact reach the focal point 199. In other embodiments, the lower seams 173, 174 may be parallel to each other or may flare outwardly away from the longitudinal axis 191 in a downward direction so as not to concentrate inflation gases that exit from the lower inflation aperture 180.

With continued reference to FIG. 6, the portion of the upper seam 172 that joins the deflector 140 to the base panel 122 can extend laterally outwardly to a greater extent than do the upper ends of the lower seams 173, 174. As a result, the lateral inflation apertures 182, 184, which are delimited by the upper seam 172 and the upper ends of the lower seams 173, 174, can be angled downwardly. Stated otherwise, the lateral inflation apertures 182, 184 can be oriented so as to direct inflation gas toward the lateral ends 196, 197 of the base panel 122 (e.g., toward the peripheral edge 198 of the base panel 122) and in a downward direction. Arrows are provided in FIG. 6 that depict the general directions at which inflation gas can exit the lateral inflation apertures 182, 184. In the illustrated embodiment, the directions have components in laterally outward directions (e.g., components outwardly along or parallel to the lateral axis 192) and components in the downward direction (e.g., downwardly along or parallel to the longitudinal axis 191). In the illustrated embodiment, the deflector 140 is configured to direct all inflation gas downwardly. Stated otherwise, the deflector 140 is configured to direct the inflation gas out of the inflation cavity without any momentum components in the upward direction. Stated in yet another manner, the deflector 140 is configured to direct all inflation gas toward a lower portion of the airbag 110, such as a portion of the airbag that is below the lateral axis 192 (or below a plane passing through the lateral axis and perpendicular to the longitudinal axis 191).

The angles at which inflation gas is expelled at the lateral inflation apertures 182, 184 can be adjusted by moving the upper ends of the lower seams 173, 174 outwardly or inwardly. In the illustrated embodiment, the lateral edges of the deflector 140 are linear and are symmetrical about the longitudinal axis 191. Each lateral edge defines an angle $\alpha$ relative to the longitudinal axis 191. The lateral inflation apertures 182, 184 can each define an angle relative to the lateral axis 197. The angles defined by the lateral inflation apertures 182, 184 can be the same as each other or different from each other, depending on the desired inflation characteristics of the airbag 110 such as whether it is desirable to initially inflate upper or lower portions of the inboard and/or outboard sides of the airbag 110. In the illustrated embodiment, each inflation aperture 182, 184 defines an angle $\beta$ relative to the lateral axis. In the illustrated embodiment, as can be appreciated from the geometry of the deflector 140, the angles $\alpha$ and $\beta$ have the same value. Other arrangements are also possible. In various embodiments, one or more of the angles $\alpha$ and $\beta$ can be no greater than about 15, 20, 25, 30, 35, 40, or 45 degrees.

Each lateral inflation aperture 182, 184 can define a maximum width $W_{TA1}$, $W_{TA2}$, respectively. The maximum widths $W_{TA1}$, $W_{TA2}$ can be the same as each other or different from each other, depending on the desired inflation characteristics of the airbag 110, such as whether it is desirable to inflate the inboard or outboard side of the airbag 110 more rapidly. A larger aperture may provide more rapid filling.

In the illustrated embodiment, the upper seam 172 is semicircular. In some instances, such a geometry can facilitate manufacture. In some instances, such a smoothly sloped shape may also reduce turbulence of inflation gas, such that inflation gas is more smoothly directed to the lateral inflation apertures 182, 184. Other shapes and configurations for the upper seam 172 are also possible. For example, the upper seam 172 may be shaped substantially as a trapezoid, and the trapezoidal shape may be enlarged (in at least the lateral direction) relative to the trapezoidal shape defined by the lower portion of the deflector 140.

FIG. 7 illustrates a stage during inflation of the airbag 110. Paths followed by inflation gas are depicted by large broken arrows. The inflation gas can exit the inflator 112 into the inflation cavity 132 that is defined by the deflector 140 and the base panel 122. The inflation gas can exit the inflation cavity 132 through the inflation apertures 180, 182, 184 in manners such as described above.

In some embodiments, a large proportion of inflation gas that exits the lower inflation aperture 180 is initially directed toward the reaction surface 155 of the tether 150. The inflation gases thus can exert a downward force on the reaction surface 155 of the tether 150, which force is transmitted to the cushioning panel 120 to drawn the cushioning panel in a downward direction during deployment of the airbag 110.

Moreover, inflation gas that exits the lower inflation aperture 180 and passes about the lateral edges of the tether 150 continues toward the lower end of the airbag 110 to initially inflate the lower end of the airbag, which can cause the airbag 110 to initially deploy downwardly rapidly, such as over a lower end of the steering wheel 52 for initial coverage of the portion of the steering wheel that is closest to the vehicle occupant.

As the airbag 110 fills with inflation gas, additional forces can act on the tether 150 as the cushioning panel 120 expands away from the base panel 122. In some embodiments, when the airbag 110 has been fully inflated and equilibrium is reached, the tether 150 may be taut. The taut tether 150 can maintain a fixed expansion distance between the base panel 122 and the cushioning panel 120, thus limiting a depth to which the airbag 110 can be expanded. In some embodiments, the tether 150 contacts the lower end of the deflector 140 when the tether is taut (see FIG. 8). In some instances, this additional contact between the tether 150 and the deflector 140 can stabilize the tether 150. For example, the lower end of the deflector 140 can also be taut, as it is held by the lower seams 173, 174, such that the lower end of the deflector 140 can brace the tether 150 at the intermediate region 154 of the tether 150.

As can be appreciated from FIG. 7, in the illustrated embodiment, the intermediate region 154 of the tether 150 is constrained to a lower portion of the airbag 110. In particular, the intermediate region 154 of the tether 150 is constrained to the portion of the airbag that is below the lateral axis 192, which is the lower half of the airbag 110 in the illustrated embodiment. Moreover, the stabilizing tether 150 does not extend upwardly into the upper regions of the airbag 110.

The lateral inflation apertures 182, 184 can cause the airbag 110 to initially deploy radially, or laterally, outward in rapid fashion. Accordingly, the apertures 180, 182, 184 can provide the airbag 110 with an initial deployment pattern that spreads rapidly downwardly and outwardly over a lower portion (e.g., lower half) of the steering wheel 52. The shape and surface area of the diffuser 140 can aid with this deployment pattern.

The diffuser 140 can also reduce material and/or manufacturing costs relative to other diffuser arrangements. For example, in some arrangements, the diffuser 140 consists of a single piece of cut material that is readily attached to the base panel 122 via relatively few seams. For example, in the illustrated embodiment, only three separate seams are used. Moreover, the seams 172, 173, 174 used to attach the diffuser 140 to the base panel 122 can be spaced from the inflator opening 123 and from the inflator 112 so as not to be in close proximity therewith. The spacing may reduce the amount of force and/or heat acting on the seams 172, 173, 174. Such an arrangement can preserve the integrity of the back panel 122 during deployment.

Figure 8:
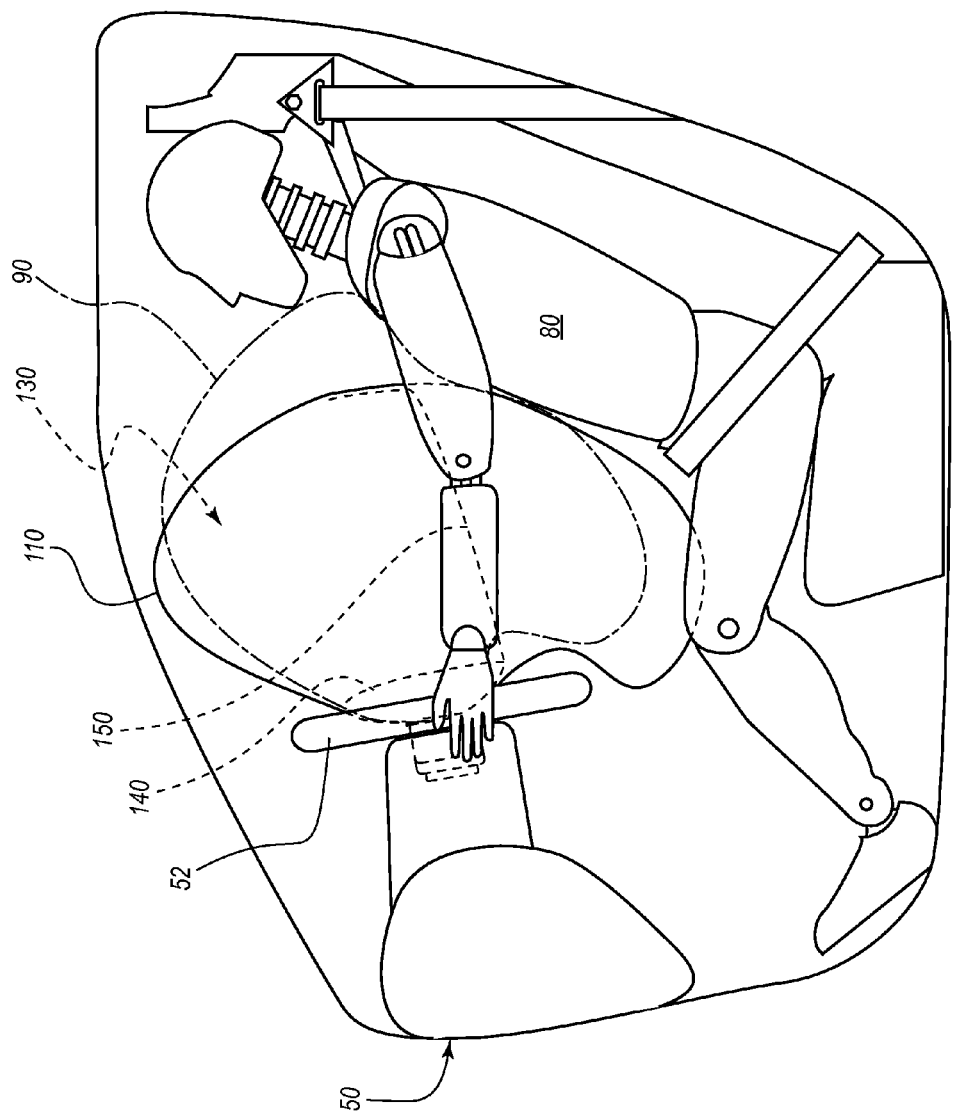
FIG. 8 is a side elevation view of the airbag assembly of FIG. 1A depicting the airbag in the deployed state within a vehicle, wherein a profile of a comparative airbag is also shown in broken lines.

FIG. 8 depicts the airbag 110 in a fully inflated state just prior to receiving the head and torso of a vehicle occupant 80. As previously discussed, the tether 150 can achieve a desired fill pattern and filled profile of the inflated airbag 110, and in some embodiments, may be further stabilized by interaction with the deflector 140. With respect to the filled profile, a filled profile of a comparative airbag 90 is shown in broken lines. The airbag 110 may be restrained from deploying in a vehicle-rearward direction to the same extent as the comparative airbag 90. This can be safer for the vehicle occupant 80. For example, in some instances, the downwardly and laterally (or radially) outwardly directed initial fill pattern of the airbag 110 and/or the filled profile of the airbag 110 that is positioned in a more car-forward (or less car-rearward) position can reduce the risk of chin entrapment of the vehicle occupant 80.

By way of illustration, if the vehicle occupant 80 in FIG. 8 were leaning forward and/or positioned closer to the steering wheel 52 at the time of airbag deployment, it can be appreciated that the airbag 90 would be more likely to entrap the chin of the vehicle occupant 80.

Figure 9:
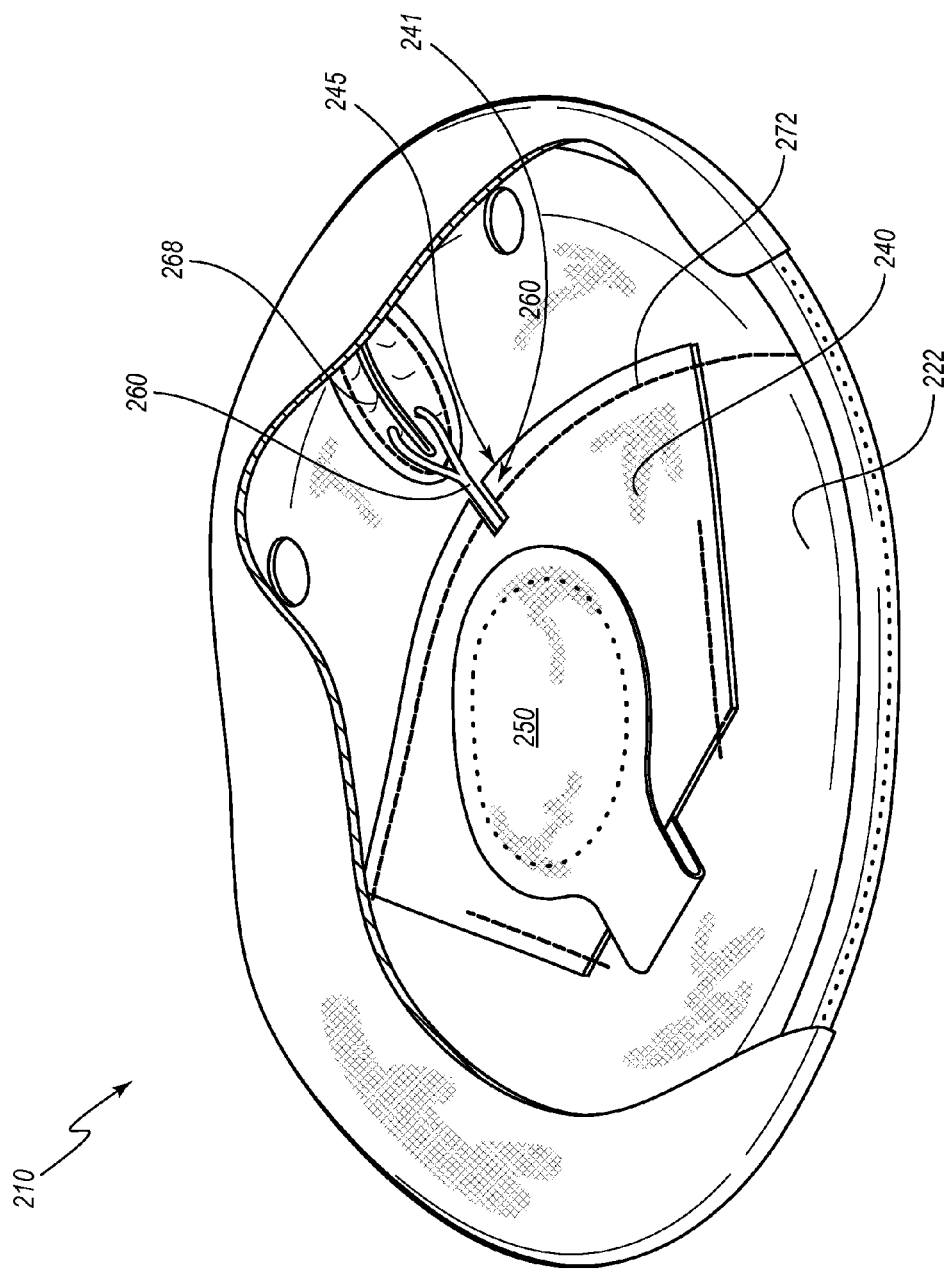
FIG. 9 is a perspective partial cutaway view of another embodiment of an airbag that is compatible with the airbag assembly of FIG. 1A.

FIG. 9 depicts another embodiment of an inflatable airbag 210 that can resemble the inflatable airbag 110 described above in certain respects, and that can be compatible with the airbag assembly 100. Accordingly, like features are designated with like reference numerals, with the leading digits incremented to "2." Relevant disclosure set forth above regarding similarly identified features thus may not be repeated hereafter. Moreover, specific features of the airbag 210 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the airbag 210. Any suitable combination of the features and variations of the same described with respect to the airbag 110 can be employed with the airbag 210, and vice versa. This pattern of disclosure applies equally to further embodiments depicted in subsequent figures and described hereafter, wherein the leading digits may be further incremented.

The airbag 210 includes a base panel 222, a deflector 240, a stabilizing tether 250, and a venting tether 260 connected to an active vent 268. The deflector 240 is attached to the base panel 222 via a plurality of seams, including an upper seam 272. The deflector defines a tether aperture 241 at its upper end through which the venting tether 260 can pass. Unlike the tether aperture 141, the tether aperture 241 is formed by a notch in an upper end 245 of the deflector 240. In particular, the upper edge of the deflector 240 is substantially semicircular, but the tether aperture 241 forms a recess at the apex of the semicircle. In certain embodiments, as with the tether aperture 141, the tether aperture 241 can snugly engage the tether 260 and may prevent or inhibit inflation gas from exiting the deflector 240 through the upper end 245 thereof. However, in some instances, a small amount of inflation gas may exit through the tether aperture 241 and may be directed toward an upper end of the airbag 210. This is in contrast to an arrangement such as the illustrated embodiment of the tether aperture 141, in which any inflation gases passing therethrough would be directed generally away from the base panel 122 and toward the cushioning panel 120.

Figure 10:
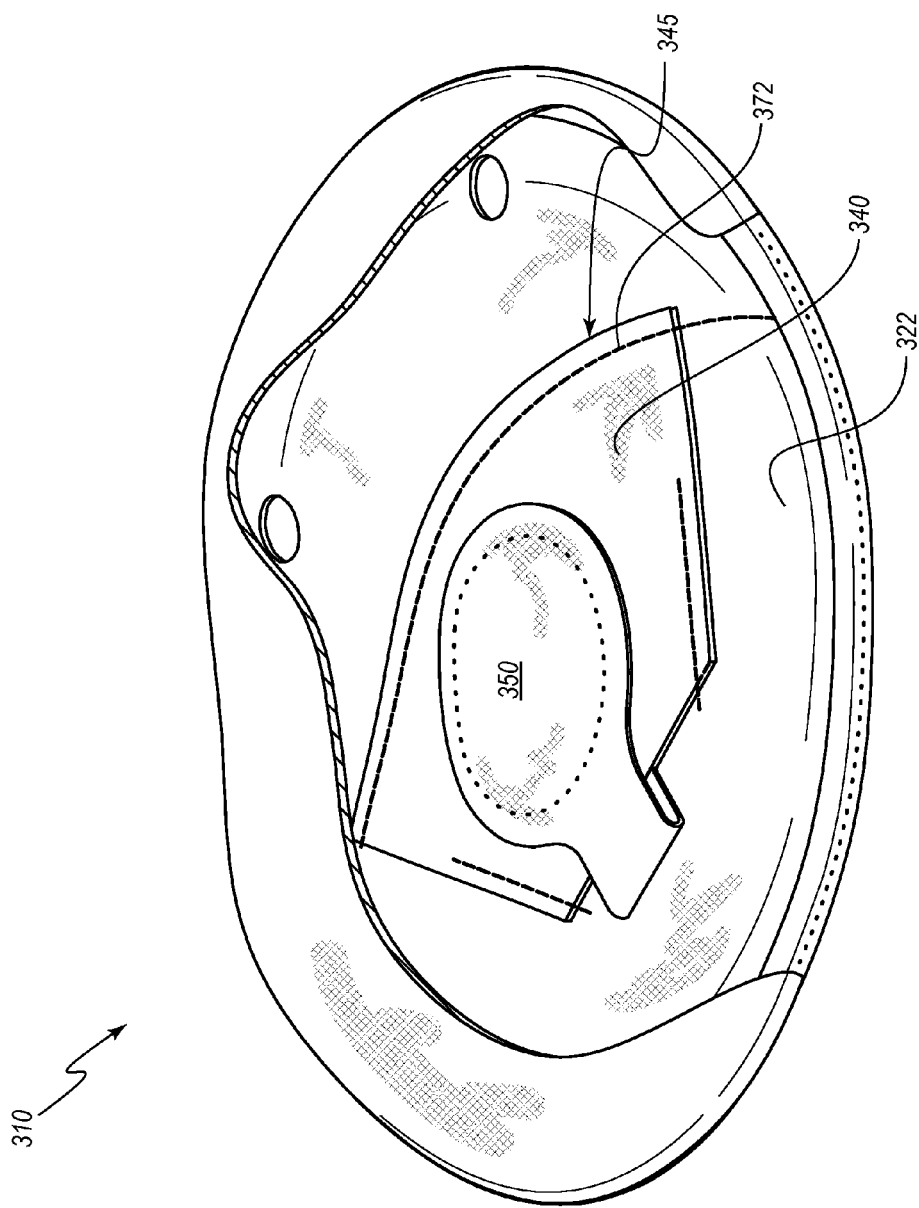
FIG. 10 is a perspective partial cutaway view of another embodiment of an airbag that is compatible with the airbag assembly of FIG. 1A.

FIG. 10 illustrates an embodiment of an airbag 310 that can resemble the airbags 110, 210 discussed above. The airbag 310 includes a base panel 322, a deflector 340, and a stabilizing tether 350, but does not include an active vent or associated venting tether. The deflector 340 can be attached to the base panel 322 via one or more upper seams, including an upper seam 372. As with the upper seam 172, the upper seam 372 is semicircular and is configured to deflect all upwardly directed inflation gas laterally outward and in a somewhat downward direction. In other embodiments, the upper seam 372 can comprise one or more seams that define a different pattern. However, the lateral edges of the upper seam 372 can be angled downward in a similar manner so as to direct inflation gas in a lateral and somewhat downward direction.

In some embodiments, one or more of the airbags 110, 210, 310 may be devoid of a stabilizing tether 150, 250, 350. Moreover, in various embodiments, the lower seams 173, 174 may define a profile other than linear. For example, in some embodiments, the lower seams 173, 174 may be curved or arcuate. Such curved or arcuate seams may taper inwardly to concentrate inflation gas in a manner such as described above. Additionally, although the foregoing disclosure has been presented primarily in the context of driver airbags, it is to be understood that certain embodiments may be used in other regions of the vehicle 50. For example, in some embodiments, an airbag 110, 210, 310 may have a different profile and may be used as a front passenger airbag. In certain embodiments, the passenger airbags 110, 210, 310 can be configured to deploy rapidly in a downward direction due to the deflector 140, 240, 340 and/or the tether 150, 250, 350. The tether 150, 250, 350 can provide the airbag 110, 210, 310 with a desired shape when inflated and can assist with ride down, in manners such as described above.

References to approximations are made throughout this specification, such as by use of the terms "about," "approximately," or "substantially." For each such reference, it is to be understood that, in some embodiments, the value, feature, or characteristic may be specified without approximation. Stated otherwise, the terms of approximation include within their scope the exact feature modified by the term of approximation. For example, it is noted that in various embodiments, the panels 120, 122 are substantially circular. It is thus understood that in certain of such embodiments, the panels 120, 122 can be exactly circular.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112(f). It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An airbag comprising:
    a base panel defining an inflator opening with which an inflator for delivering inflation gas into the airbag can be coupled, the base panel comprising a top end and a bottom end, wherein the base panel is configured to be mounted to a vehicle such that the top end of the base panel is at an upper position and the bottom end of the base panel is at a lower position, relative to the vehicle, when the airbag is in a deployed state;

a cushioning panel attached to the base panel and cooperating therewith to define an inflatable chamber;

a deflector attached to the base panel and positioned between the base panel and the cushioning panel, wherein the deflector covers the inflator opening of the base panel and cooperates with the base panel to define a lower inflation aperture that is closer to the bottom end of the base panel than is the inflator opening, and wherein the deflector is configured to direct inflation gas downwardly through the lower inflation aperture toward the bottom end of the base panel during deployment of the airbag; and a tether attached to the base panel and the cushioning panel, wherein the tether extends through the lower inflation aperture defined by the deflector and the base panel.

2. The airbag of claim 1, wherein the tether defines a reaction surface that faces the lower inflation aperture, and wherein inflation gases exert a downward force on the reaction surface of the tether during deployment of the airbag, which downward force is transmitted to the cushioning panel to draw the cushioning panel in a downward direction during deployment of the airbag.

3. The airbag of claim 2, wherein a first portion of the tether extends downwardly through the lower inflation aperture and a second portion of the tether rotates upwardly and extends toward the cushioning panel, and wherein an upper side of the second portion of the tether that rotates upwardly comprises the reaction surface.

4. The airbag of claim 1, wherein the tether is configured to maintain a fixed expansion distance between the base panel and the cushioning panel when the tether is taut during deployment of the airbag, and wherein the tether contacts a portion of the deflector that assists in defining the lower inflation aperture when the tether is taut.

5. The airbag of claim 1, wherein the deflector is attached to the base panel via a pair of lower seams that delimit a maximum lateral width of the lower inflation aperture, wherein the pair of lower seams are positioned at opposite lateral sides of the tether and are spaced outwardly from the tether such that the maximum lateral width of the lower inflation aperture is greater than a maximum width of a portion of the tether that is at an interior of the lower inflation aperture.

6. The airbag of claim 5, wherein the pair of lower seams taper inwardly toward the tether in a downward direction to concentrate inflation gas toward the lower inflation aperture.

7. The airbag of claim 5, further comprising one or more upper seams that attach an upper end of the deflector to the base panel.

8. The airbag of claim 7, wherein at least a portion of the one or more upper seams is closer to the top end of the base panel than is the inflator opening.

9. The airbag of claim 7, wherein the deflector cooperates with the base panel to define a first lateral inflation aperture and a second lateral inflation aperture, wherein a maximum width of the first lateral inflation aperture is delimited by the one or more upper seams and one of the lower seams and a maximum width of the second lateral inflation aperture is delimited by the one or more upper seams and the other of the lower seams, and wherein the deflector is configured to direct inflation gas downwardly and in laterally opposite directions through the first and second lateral inflation apertures.

10. The airbag of claim 9, wherein the one or more upper seams extend laterally outwardly to a greater extent than do the upper ends of the pair of lower seams, and wherein the first and second lateral inflation apertures are angled downwardly such that inflation gas exits through the first and second lateral apertures in directions having downward and laterally outward components without upward components.

11. The airbag of claim 7, wherein the deflector cooperates with the base panel to define an inflation cavity, and wherein the one or more upper seams comprise a continuous seam that extends laterally outwardly beyond a lateral extent of the lower seams to prevent inflation gases from exiting the inflation cavity in any direction having an upward component.

12. The airbag of claim 1, wherein a first portion of the tether is attached to a central region of the base panel and a second portion of the tether is attached to a central region of the cushioning panel.

13. The airbag of claim 1, wherein the base panel is configured to be mounted to the vehicle via one or more mounting apertures through which mounting hardware can extend.

14. The airbag of claim 1, wherein the tether is the only tether attached to both the base panel and the cushioning panel, and wherein an intermediate portion of the tether that extends between the base panel and the cushioning panel is constrained to a lower half of the airbag.

15. The airbag of claim 1, further comprising a trunk vent attached to a release tether that extends through a tether aperture defined by the deflector.

16. An airbag comprising:
a base panel defining an inflator opening with which an inflator for delivering inflation gas into the airbag can be coupled, the base panel comprising a top end and a bottom end, wherein the base panel is configured to be mounted to a vehicle such that the top end of the base panel is at an upper position and the bottom end of the base panel is at a lower position, relative to the vehicle, when the airbag is in a deployed state;

a cushioning panel attached to the base panel and cooperating therewith to define an inflatable chamber; and a deflector positioned between the base panel and the cushioning panel and covering the inflator opening of the base panel, wherein the deflector cooperates with the base panel to define:
an inflation cavity;
a first lateral inflation aperture configured to direct inflation gas out of the inflation cavity in a direction having components in a first laterally outward direction and in a downward direction, without a component in an upward direction, during deployment of the airbag;
a second lateral inflation aperture configured to direct inflation gas out of the inflation cavity in a direction having components in a second laterally outward direction and in the downward direction, without a component in the upward direction, during deployment of the airbag, wherein the second laterally outward direction is opposite of the first laterally outward direction; and
a lower inflation aperture that is closer to the bottom end of the base panel than is the inflator opening, wherein the lower inflation aperture is configured to direct inflation gas out of the inflation cavity in the downward direction toward the bottom end of the base panel during deployment of the airbag;

wherein the deflector is configured to direct all inflation gas out of the inflation cavity in directions that have no upward component.

17. The airbag of claim 16, wherein the first lateral inflation aperture, the second lateral inflation aperture, and the lower inflation aperture are the only apertures defined by the deflector through which inflation gas is permitted to exit the inflation cavity into the inflatable chamber.

18. The airbag of claim 16, wherein the deflector is configured to concentrate inflation gas toward the lower inflation aperture.

19. The airbag of claim 16, further comprising a pair of lower seams that attach a portion of the deflector to the base panel, wherein the pair of lower seams delimit a maximum lateral width of the lower inflation aperture, and wherein the pair of lower seams taper inwardly in a downward direction to concentrate inflation gas toward the lower inflation aperture.

20. The airbag of claim 19, further comprising one or more upper seams that attach an upper end of the deflector to the base panel, wherein at least a portion of the one or more upper seams is closer to the top end of the base panel than is the inflator opening.

21. The airbag of claim 20, wherein the one or more upper seams extend laterally outwardly to a greater extent than do the upper ends of the pair of lower seams, and wherein the first and second lateral inflation apertures are angled downwardly such that inflation gas exits through the first and second lateral apertures in directions having downward and laterally outward components without upward components.

22. The airbag of claim 20, wherein the one or more upper seams extend laterally outwardly beyond a lateral extent of the lower seams and close an upper end of the inflation cavity to prevent inflation gases from exiting the inflation cavity in any direction having an upward component.

23. The airbag of claim 16, further comprising one or more upper seams that extend laterally outwardly beyond a lateral extent of the lower inflation aperture and close an upper end of the inflation cavity to prevent inflation gases from exiting the inflation cavity in any direction having an upward component.

24. The airbag of claim 16, further comprising a tether that extends through the lower inflation aperture, wherein the tether is attached to the cushioning panel.

25. The airbag of claim 24, wherein a first portion of the tether is attached to a central region of the base panel and a second portion of the tether is attached to a central region of the cushioning panel.

26. The airbag of claim 16, further comprising a trunk vent attached to a release tether that extends through a tether aperture defined by the deflector.

27. An airbag assembly comprising:
a housing configured to be mounted to a vehicle;
an inflator coupled to the housing; and
an airbag packaged within the housing and coupled with the inflator, wherein the airbag comprises:
a base panel defining an inflator opening with which the inflator is coupled, the base panel comprising a top end and a bottom end, wherein the housing is configured to be mounted to the vehicle such that the top end of the base panel is at an upper position and the bottom end of the base panel is at a lower position, relative to the vehicle, when the airbag is in a deployed state;
a cushioning panel attached to the base panel and cooperating therewith to define an inflatable chamber; and
a deflector attached to the base panel and positioned between the base panel and the cushioning panel,
an inflation cavity;
a first lateral inflation aperture configured to direct inflation gas out of the inflation cavity in a direction having components in a first laterally outward direction and in a downward direction, without a component in an upward direction, during deployment of the airbag;
a second lateral inflation aperture configured to direct inflation gas out of the inflation cavity in a direction having components in a second laterally outward direction and in the downward direction, without a component in the upward direction, during deployment of the airbag, wherein the second laterally outward direction is opposite of the first laterally outward direction; and
a lower inflation aperture that is closer to the bottom end of the base panel than is the inflator opening, wherein the lower inflation aperture is configured to direct inflation gas out of the inflation cavity in the downward direction toward the bottom end of the base panel during deployment of the airbag;
wherein the deflector is configured to direct all inflation gas out of the inflation cavity in directions that have no upward component.

28. The assembly of claim 27, wherein the airbag further comprises a tether attached to the base panel and to an interior surface of the cushioning panel, wherein the tether extends through the lower inflation aperture defined by the deflector and the base panel.

29. The assembly of claim 28, wherein the tether defines a reaction surface that faces the lower inflation aperture, and wherein inflation gases exert a downward force on the reaction surface of the tether during deployment of the airbag, which downward force is transmitted to the cushioning panel to draw the cushioning panel in a downward direction during deployment of the airbag.

* * * * *